(12) United States Patent
Peng et al.

(10) Patent No.: US 10,503,651 B2
(45) Date of Patent: Dec. 10, 2019

(54) MEDIA CACHE BAND CLEANING

(71) Applicant: Seagate Technology LLC, Cupertino, CA (US)

(72) Inventors: CheeHou Peng, Singapore (SG); ThanZaw Thein, Singapore (SG); WenXiang Xie, Singapore (SG); PohSeng Lim, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 118 days.

(21) Appl. No.: 15/394,558

(22) Filed: Dec. 29, 2016

(65) Prior Publication Data

US 2018/0189185 A1 Jul. 5, 2018

(51) Int. Cl.
*G06F 12/02* (2006.01)
*G06F 12/0873* (2016.01)
*G06F 12/0868* (2016.01)

(52) U.S. Cl.
CPC ...... *G06F 12/0873* (2013.01); *G06F 12/0868* (2013.01); *G06F 2201/885* (2013.01); *G06F 2212/1024* (2013.01); *G06F 2212/1044* (2013.01); *G06F 2212/462* (2013.01); *G06F 2212/502* (2013.01)

(58) Field of Classification Search
None
See application file for complete search history.

(56) References Cited

U.S. PATENT DOCUMENTS

| 5,649,153 | A | * | 7/1997 | McNutt | G06F 12/0866 711/112 |
| 8,976,478 | B1 | | 3/2015 | Harllee, II et al. | |
| 9,007,710 | B1 | | 4/2015 | Liu et al. | |
| 9,990,949 | B1 | * | 6/2018 | Liu | G11B 5/012 |
| 2013/0246703 | A1 | * | 9/2013 | Bandic | G11B 5/012 711/113 |
| 2015/0294684 | A1 | | 10/2015 | Qjang et al. | |
| 2017/0249255 | A1 | * | 8/2017 | Edwards | G06F 12/1009 |
| 2018/0046382 | A1 | * | 2/2018 | Liu | G06F 3/0611 |

* cited by examiner

*Primary Examiner* — Charles Rones
*Assistant Examiner* — Ryan Dare
(74) *Attorney, Agent, or Firm* — Holzer Patel Drennan

(57) ABSTRACT

A data storage device includes a media cache and a main data store optimized for sequential reads and organized into bands. When the data storage device receives a read request from a host computing system, the requested data may be fragmented across the media cache and the main data store, causing constrained read throughput. Band rewrite operations to improve read throughput are selected based on a hit tracking list including a hit counter associated with each band on the main data store. The hit counter tracks the number of times a host computing system has requested data in logical block addresses corresponding to the various bands. The data storage device may select bands for band rewrite operations based on the number of hits in the associated hit tracking counters.

20 Claims, 4 Drawing Sheets

FIG.1

MEDIA CACHE BAND CLEANING

BACKGROUND

A data storage device with a media cache and a next-level data storage tier optimized for sequential reads, such as a device using shingled magnetic recording (SMR), may experience constrained throughput if the data to be read by a host is fragmented on the media cache or fragmented between the media cache and the main data store. "Cleaning" the media cache based on a first-in-first-out manner may be inefficient computationally and/or in terms of power consumption.

SUMMARY

Implementations described and claimed herein address the foregoing problems by providing a hit-based band cleaning data storage device with a main data store for storing data arranged into a plurality of bands, a media cache including a plurality of segments, the segments configured to store data received from a host, a storage controller communicatively coupled to the host via a host interface and configured to allow the host to store data to and read data from the media cache and the main data store. The data storage device further includes a hit-tracking module configured to count read requests from the host for the plurality of bands in a hit-tracking list and a band cleaning module configured to perform a band cleaning operation on a band in the plurality of bands based at least in part on the hit-tracking list.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
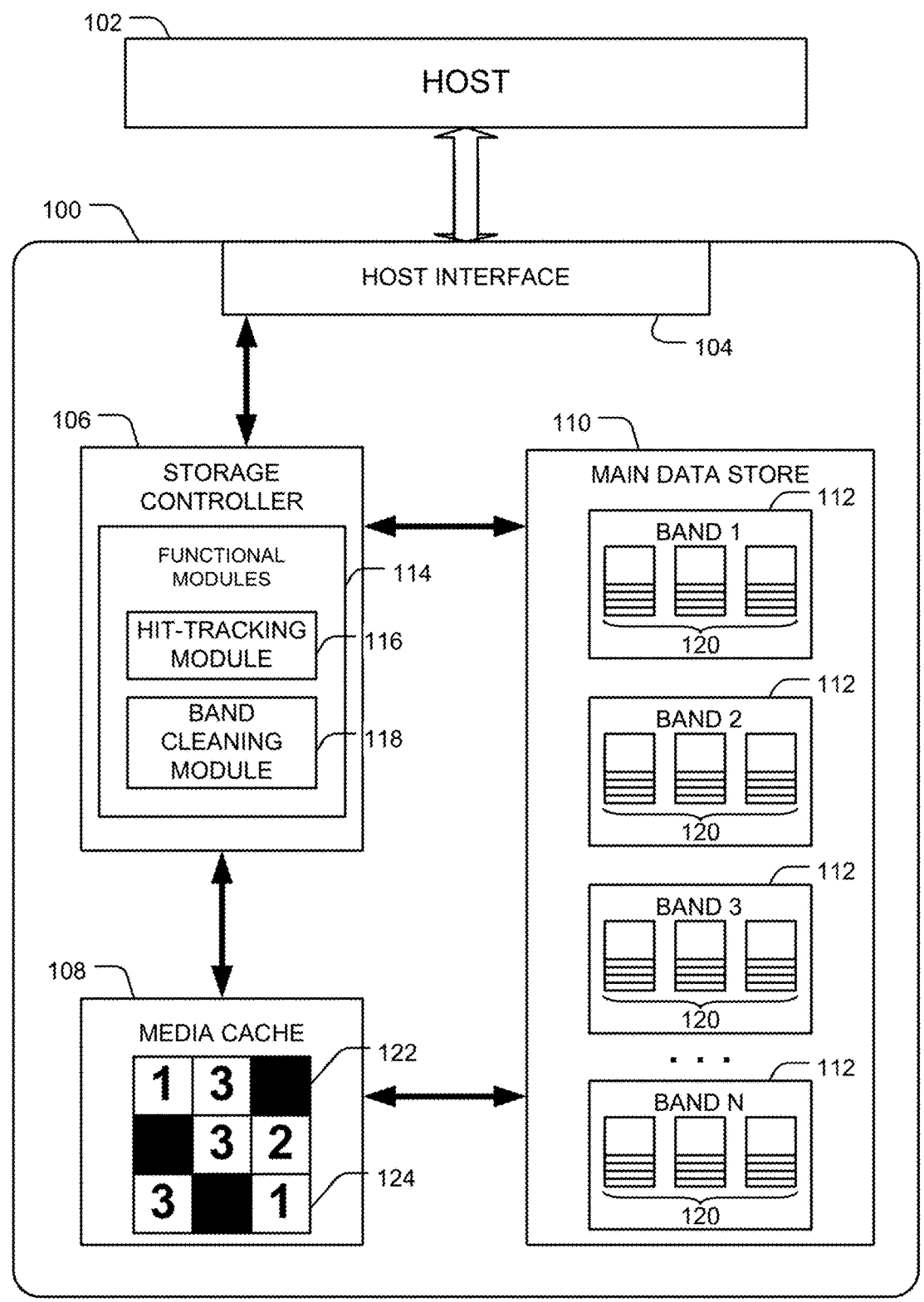
FIG. 1 is a schematic diagram of an example hit-based band cleaning data storage device.

The present disclosure includes a system and methods for mitigating constrained read throughput on a data storage device due to data fragmentation on a media cache or fragmented between media cache and tracks on a main data store where the main data store is optimized for sequential reads. In an implementation, the main data store includes a disc recording medium with a plurality of data tracks on the recording surface of the disc. Sets of contiguous tracks may be grouped into bands of tracks. In some implementations, some or all of the tracks on a disc may be recorded in a shingled manner, also referred to herein as shingled magnetic recording (SMR), wherein some tracks partially overlap adjacent tracks. Shingled recording can increase the amount of data that may be stored on a disc compared to non-shingled recording, but there are limitations on how data is written to the tracks compared to conventional magnetic recording. When executing a write operation on an SMR disc, the operation writes to a track that may cause the adjacent track on either side of the written track to also be partially overwritten due to the overlapping arrangement of tracks. In contrast to conventional magnetic recording methods, SMR can result in an increase of the tracks per inch (TPI) characteristic as a recording density of a storage medium.

If tracks in an SMR data storage device are arranged close enough together, for example by being overlapped by adjacent tracks on both sides, data on a given track may become difficult or impossible to read. Adjacent Track Interference (ATI) can cause the data in a first written track to become unreadable due to being partially overlapped by both adjacent tracks or by being partially overwritten by both adjacent tracks. Changing the data recorded to a track after an adjacent track has been recorded therefore may require a different writing strategy compared to non-shingled tracks, which can simply be overwritten at any time.

In some embodiments, a constraint may be imposed that, after writing to a track, an adjacent track may not be written to. A consistent writing direction may be designated for a set of tracks such that tracks are written one after another only in the same writing direction. In other embodiments, writing to a given track after an adjacent track has been written to may require rewriting all shingled tracks that follow the given track. To accomplish writing to shingled tracks efficiently, a set of shingled tracks may be grouped into a band, such that writing the last track of a given band does not require rewriting any of the remaining tracks in the band. The main data store may be divided into a plurality of bands, e.g., Band 1, Band 2, Band 3 . . . Band N with each band containing a plurality of shingled data tracks. The tracks included in the bands of tracks that are partially overlapping adjacent tracks and have a reduced track width. For example, the shingled or overlapped tracks may have a reduced read width relative to their write width.

When data is to be written to a shingled band, the data may be recorded to tracks of the band in a specified order, starting with a beginning track and continuing until a final track has been recorded. As such, if data is to be written to a shingled track in the band, the data of the target track and all following tracks is rewritten to avoid data loss. A process of rewriting data to the band is referred to herein as a Band Rewrite Operation (BRO), BRO cleaning, or band cleaning. BRO cleaning may include reading data from a target band, storing a copy to a separate memory location, such as a register or cache memory, modifying the copy of the data with the new data to be written, and rewriting the modified data back to the band.

Data to be written to a shingled track is not always immediately written directly to the track after it is received from a host. Instead, the data to be written to the track is written to a media cache. Storing received data on a media cache fragments the data from the main store. If the data storage device receives a read request from a host for fragmented data, the data storage device responds by reading the data from a combination of the media cache and from tracks on the main data store. A fragmented read is likely to result in reduced read throughput compared to a read operation on data that is not fragmented across a media cache and a main data store. Since the media cache can only hold a limited amount, data is transferred in batch from the media cache to the main store by BRO cleaning bands of tracks on the main store. BRO cleaning thus reduces saturation on the media cache and reduces fragmentation of data between the media cache and the main store. BRO cleaning may include reading data from the tracks in a band, storing the data in a cache, modifying the data based on data evicted from the media cache, and rewriting the band of tracks with the new data to produce a "cleaned" band. In some implementations, all the data from a band may be read, modified, and re-written. Alternatively, only a subset of the tracks of the target band may be read, modified, and re-written.

BRO cleaning can be a time-intensive process, and can lead to persisting constrained read throughput for bands waiting to be band cleaned during runtime, especially if fragmented data from those bands contains hotter data. Instead of performing band cleaning on bands in a FIFO (first in-first out) manner, the hit-based band cleaning data storage device maintains a read request hit tracking list for bands of tracks on the main store and performs band cleaning on a triaged, hit-based criteria. The hit tracking list includes hit counters associated with each of the physical address bands available on the main data store. The hit-based band cleaning data storage device increments the hit counter corresponding to a band of tracks when it receives a read request from a host for data residing in the media cache corresponding to one of the tracks in the band. A hit tracking list with counters for the bands on a main store which physical address bands are receiving the most fragmented read requests and therefore which bands are more likely to be suffering from constrained read throughput. Instead of band cleaning in a FIFO manner, the hit-based band cleaning data storage device may prioritize band cleaning for bands of tracks with high hit counts over bands of tracks with lower hit counts, thereby improving overall read throughput and reducing saturation on the media cache. Prioritizing bands for cleaning operations may be done according to various strategies including when media cache resource usage levels are above a threshold, when a hit counter for a particular band exceeds a threshold, for the band with the highest hit count, and/or a weighted score depending on both the number of hits from a host and the relative amount of fragmentation of the band, etc. In implementations wherein a weighted score is used to determine which band is to be the subject of the next band cleaning operation, a band with higher overall fragmentation but a lower hit rate may be chosen over a band with lower fragmentation but a higher hit rate if the chosen band would improve read throughput to a greater degree. Table 1 is the contents of an example hit tracking list.

TABLE 1

| Band No. | Logical Block Address Range | Hit Counter |
|---|---|---|
| 1 | Logical Block Address Range A | 7 |
| 2 | Logical Block Address Range B | 13 |
| 3 | Logical Block Address Range C | 12 |
| 4 | Logical Block Address Range D | 2 |
| 5 | Logical Block Address Range E | 0 |
| 6 | Logical Block Address Range F | 0 |

In other implementations, the main data store is not organized as a SMR storage media. The present disclosure relates to any storage device where a media cache is cleaned where the next tier is optimized for sequential reads and media cache hits fragment read requests on the media cache or between the media cache and the main data store. For example without limitation, the main data store may be organized into bands of overlapped tracks with an interlaced layout. In yet other implementations, the main data store may be organized based on abstractions other than bands of tracks. For example without limitation, the main data store may be organized based on files or sorted string tables as the unit of cleaning or merge-sorting where a high hit rate on a lower level might trigger a compaction to a higher level. As used in this disclosure, the term "tracks" can refer to any organizational abstraction on a media store optimized for sequential reads, the term "bands" can refer to any grouping of data on a media store optimized for sequential reads, and the terms "band rewrite operation" and "band cleaning" refer to any cleaning operation of data on a media cache to a main data store optimized for sequential reads, even if the main data store is organized according to abstractions other than tracks or bands.

FIG. 1 is a schematic diagram of an example hit-based band cleaning data storage device 100. The hit-based band cleaning data storage device 100 includes a storage controller 106 with functional modules 114 that communicatively couples a main data store 110 and a media cache 108 to a host 102 via a host interface 104. The storage controller 106 may include one or more circuits or processors configured to control operations of the hit-based band cleaning data storage device 100, such as storing data to or retrieving data from the main data store 110 and the media cache 108 and/or other caches located on the storage controller 106 or separately. The storage controller 106 may utilize communication interfaces and protocols including wired or wireless protocols including SATA, SCSI, eSATA, SAS, USB, IEEE 1394, Ethernet, Apple Thunderbolt™, PCIe, fiber channel, and others to communicate with the host 102 via the host interface 104.

In an implementation, the hit-based band cleaning data storage device 100 is a shingled magnetic recording (SMR) data storage device. In other implementations, the hit-based band cleaning data storage device 100 is another type of data storage optimized for sequential reads. The main data store 110 is organized into bands 112, each band 112 composed of tracks 120. The storage controller 106 provides a mechanism to allow the host interface 104 to store data to and read data from the hit-based band cleaning data storage device 100, including data stored in the media cache 108 and/or the main data store 110.

Data received by the storage controller 106 from the host 102 via the host interface 104 is stored to segments 122, 124 on media cache 108. The media cache 108 may be various types of storage media including a volatile random access memory (RAM) storage media such as DRAM, a non-volatile RAM, such as NAND flash memory, a dynamic memory storage tier, etc. The main data store 110 may include various types of storage media including without limitation a rotating magnetic disk data storage media, non-volatile RAM, etc. Segment 122 of media cache 108 indicates an evicted segment and segment 124 indicates a segment that holds data waiting to be written to Band 1. The tracks 120 in bands 112 on the main data store 110 may contain of physical block addresses that are mapped to logical block addresses that are also represented on the media cache 108. Thus, when the host 102 writes data to a logical block address, that data could be stored either on the media cache 108 or the main store 110. In an implementation, the mapping of logical block addresses to the physical addresses on the media cache 108 occurs when data is written to the media cache 108. When the host 102 requests to read data in logical addresses mapped to the media cache 108, the requested data will be read from the media cache 108. After data is cleaned from the media cache 108 to the main data store 102, the mapping of the logical block addresses to the media cache 108 is removed.

The storage controller 106 includes functional modules 114. Functional modules 114 may be one or more processors, controllers, or other circuits, or functional modules 114 may be a set of software instructions that, when executed by a processing device, perform the functions of the functional modules 114 described herein. Although the functional modules 114 are shown herein as part of the storage controller 106, in some embodiments, the functional modules 114 may be separate from and executed by the storage controller 106.

Functional modules 114 include a hit-tracking module 116. Hit-tracking module 116 is configured to perform a variety of operations including instantiating and updating a hit-tracking list with entries for one or more physical address bands on main data store 100. In an implementation, the hit-tracking module 116 includes a hit-tracking list with hit counters corresponding to each of the one or more physical address bands. The hit-tracking module 114 is further operable to monitor read requests received by the storage controller 106 from the host 102, and to increment hit counters in the hit-tracking list corresponding to physical address bands on the main data 110 based on the received read requests. Hit-tracking module 116 is further configured to reset hit counters to zero in the hit-tracking list corresponding to physical address bands for which BRO cleaning has been performed.

Functional modules 114 also include a band cleaning module 118. The band cleaning module 118 is configured to perform band cleaning operations on bands 112 of tracks 120 on the main data store 110. Band cleaning operations carried out by band cleaning module 118 may include reading data from a band 112, writing the data to a band cleaning cache located on the storage controller 106 or separately (not shown), reading data from a segment 124 on a media cache 108 stored in logical addresses corresponding to the read band 112, evicting the data read from the segment 124 on the media cache 108, modifying the data on the band cleaning cache according to the data read from segment 124 of the media cache 108, and writing the modified data to tracks 120 on a band 112.

The band cleaning module 118 may be further configured to monitor a saturation level of media cache 108 and to initiate band cleaning if the saturation of media cache exceeds a saturation condition. In an implementation, media cache 108 exceeds a saturation condition if 80% of the segments on media cache 108 contain valid data. In another implementation, media cache 108 exceeds a saturation condition if 90% of the nodes on media cache 108 contain valid data. In at least one implementation, the band cleaning module 118 is configured to adjust total time to perform band cleaning based at least in part on the workload level of the host. For example, when the workload from the host is high, then the time interval to perform hit-based band cleaning operations is long and the duration of the band cleaning operations is short. In another example, when the workload from the host is moderate, then the time interval to perform hit-based band cleaning operations is moderate and the duration of the band cleaning operations is moderate. In yet another example, when the workload from the host is idle, then the time interval to perform hit-based band cleaning operations is shot and the duration of the band cleaning operations is long.

Figure 2:
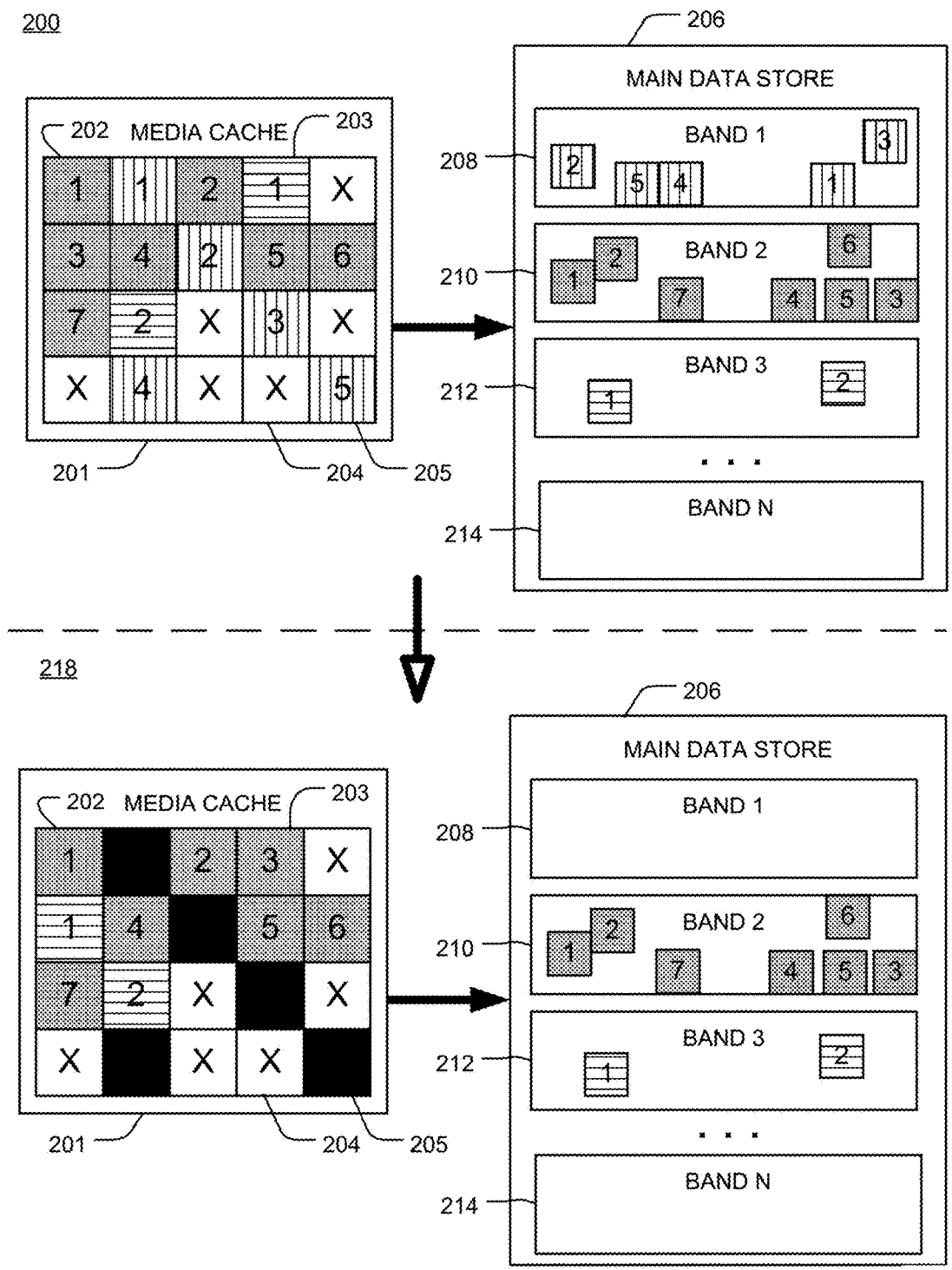
FIG. 2 is block diagram illustrating the effect of a hit-based band cleaning operation on nodes in a media cache nodes and bands on a main data store in an example hit-based band cleaning data storage device.

FIG. 2 is block diagram illustrating the effect of a hit-based band cleaning on segments 202, 203, 204, 205 in a media cache 201 and bands 208, 210, 212, 214 on a main data store 206 in an example hit-based band cleaning data storage device. Area 200 illustrates the contents of media cache 201 and main date store 206 before a band cleaning operation. The media cache 201 is depicted as having a 4×4 array of segments. The segments are shaded according to the band for which they hold data. For example, segment 203 has shading that matches Band 1. Segment 202 has shading that matches Band 2, segment 205 has shading that matches Band 3. Segments marked with an X, such as segment 204, contain data assigned to logical block addresses corresponding to other bands up to Band N. Area 200 illustrates the media cache 201 above a saturation condition and storing data that is fragmented across several bands. As such, a band cleaning operation will reduce media cache 201 saturation and reduce fragmentation between the media cache 201 and the band that is cleaned.

Area 218 of FIG. 2 illustrates the contents of media cache 201 and main data store 206 after a band cleaning operation has evicted segments storing data corresponding to tracks in Band 1, e.g., segment 205. In an implementation, Band 1 is chosen for the band cleaning operation because a counter in a hit-tracking list corresponding to Band 1 has the highest value of any hit counters associated with the Bands 1-N. The band on main data store 206 with the highest value hit counter may not necessarily be the band with the most fragmentation. For example, Band 2 has more fragmentation than Band 1, but Band 1 may be the subject of more read requests from the host. Therefore a band cleaning operation on Band 1 can reduce fragmented reads more than a band cleaning operation on Band 2.

Figure 3:
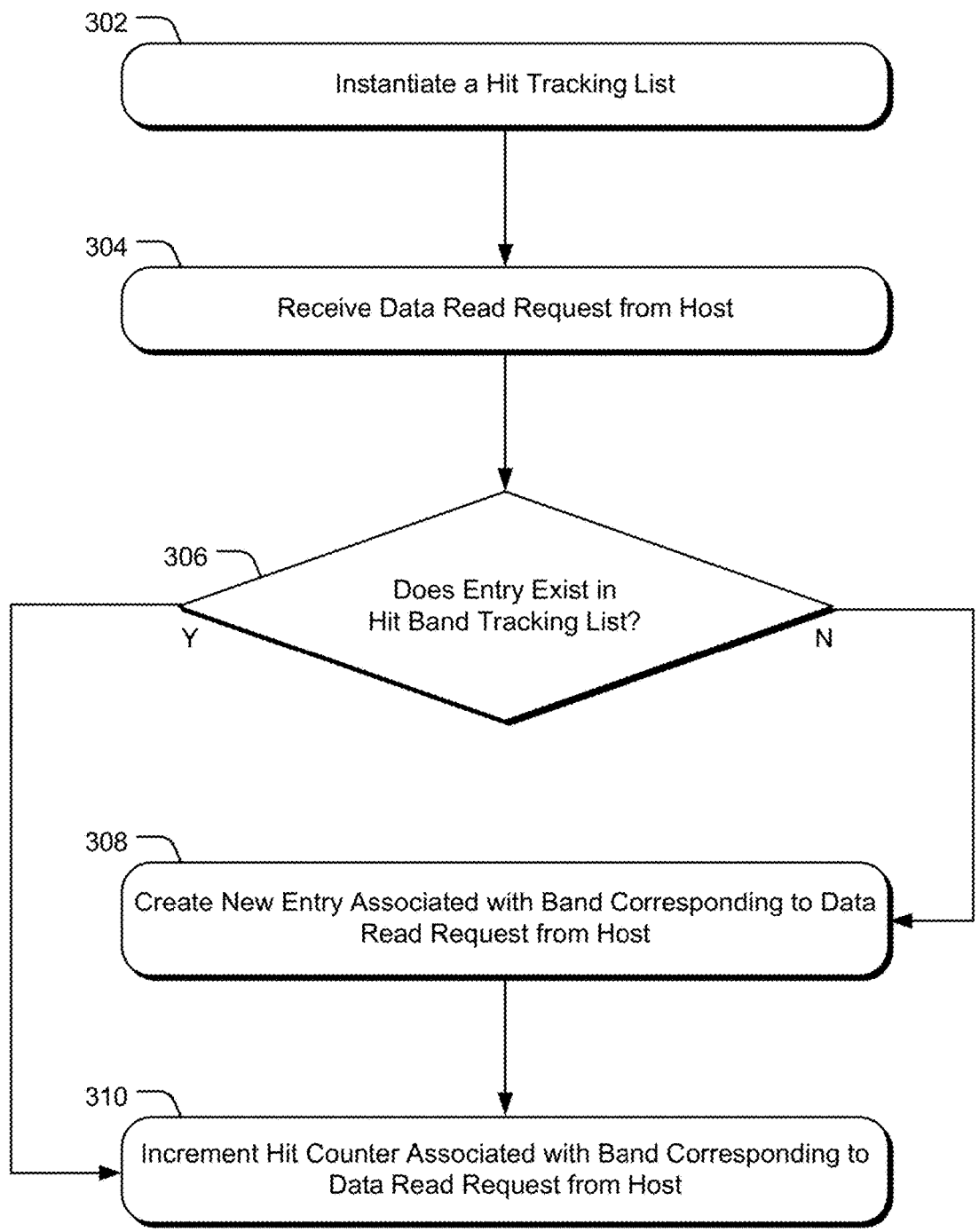
FIG. 3 illustrates example operations for tracking hits to bands of tracks on a main data store.

FIG. 3 illustrates example operations 300 for tracking data request hits to bands of tracks on a main data store. Operation 300 is to instantiate a hit tracking list. The hit tracking list may contain a plurality of entries or the hit tracking list may be instantiated with no valid data. The hit tracking list may reside in non-volatile memory such that the list will be recoverable if there is an unplanned loss of power to the data storage device.

Operation 304 is to receive a data read request from a host computing device. The request from the host computing device may include a request to read data stored in one or more logical block addresses on the data storage device. Because the main data store may be organized into bands of tracks, data previously written to the data storage device by the host computing system may be fragmented between a main data store and a media cache. The data requested to be read by the host in operation 304 therefore may be partially located in a band of tracks on the main data store and partially located on the media cache and/or any combination of the two.

Decision block 306 depends on whether an entry associated with the band of tracks on the main data store exists in the hit tracking list. In an implementation, the hit tracking list is instantiated at operation 302 with no valid data because entries in the list are only created after the data storage device has received at least one read request from a host for data residing in logical block addresses corresponding to a band of tracks on the main data store. As such, the hit tracking list need not contain entries for bands that have received no data read requests from the host computing device. In other implementations, operation 302 may instantiate a hit tracking list with one or more entries associated with bands of tracks on the main data store before the data storage device has received data read requests for data corresponding to those bands.

If no entry in the hit tracking list associated with the band corresponding to the logical addresses of the data read request received from the host computing system, then operation 308 creates such an entry. An entry in the hit tracking list associated with a band of tracks on the main data store may contain information relating to the band. For example, an entry in the hit tracking list contains a hit-counter indicating the number of times the data storage device has received a data read request from a host for data in logical block addresses corresponding to the band. In another example, the entry in the hit tracking list contains a hit-counter indicating the number of times the data storage device has received a data read request from a host for data in logical block addresses corresponding to the band since the last completed band cleaning operation on the band.

An entry in the hit tracking list may contain other information relating to the band as well. For example, the entry in the hit tracking list may include a start logical block address and an end logical block address identifying the logical block address range corresponding to the band. In another example, the entry in the hit tracking list may include a timestamp that indicates the last time a read request was received from a host computing device for data residing in logical block addresses corresponding to the band. In yet another example, the entry in the hit tracking list may include a second timestamp indicating the time of the last completed band rewrite operation on the band. Operation 310 is to increment the hit-counter associated with the band of tracks on the main data store corresponding to the logical block addresses of the data requested by the host computing system.

Figure 4:
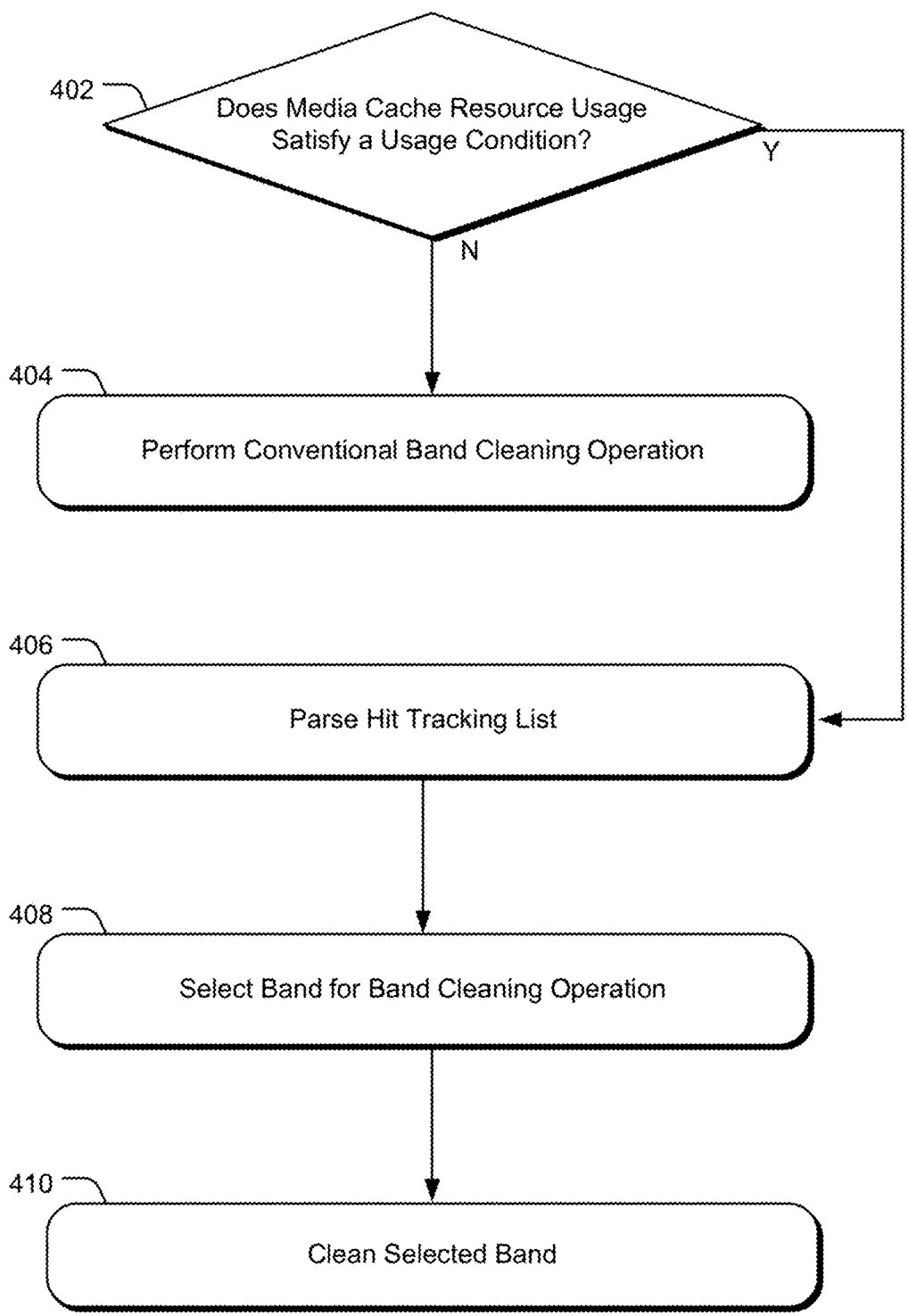
FIG. 4 illustrates example operations for hit-based band cleaning based on a main data store.

FIG. 4 illustrates example operations 400 for hit-based band cleaning based on a main data store. Decision block 402 is whether the resource usage in a media cache satisfies a usage condition. In an implementation, the resource usage in the media cache satisfies a usage condition if 50% of the media cache is occupied. In another implementation, the resource usage in the media cache satisfies a usage condition if over 80% of the segments in the media cache are used or if over 90% of the nodes in the media cache are used. Other levels of resource usage on the media cache may also be used to determine whether a media cache usage satisfies a usage condition.

If the media cache resource usage does not satisfy a usage condition, then operation 404 performs a conventional band cleaning operation. As used herein, a conventional band cleaning operation is a band cleaning operation that is not based on tracked hits to bands of tracks on a main data store. Instead, a conventional band cleaning operation may be based on another type of criteria. For example, a conventional band cleaning operation may select a band for cleaning in a FIFO (first in-first out) manner. In another example, a conventional band cleaning operation may select a band for cleaning based on a LIFO (last in-first out) manner.

Operation 406 is to parse the hit tracking list. The parsing of operation 406 may identify information regarding the bands of tracks on the main data store associated with the entries in the hit tracking list. Parsing is an operation wherein a process intakes information, such as the reading of a computer file, and stores it in a memory that is accessible to other processes that analyze the data. In the example of the hit tracking list, a parsing process reads the list and makes it available for operations by other processes to read the entries contained therein. In an implementation, operation 406 parses the hit tracking list to collect information relating to the bands represented in the list including which band has the highest hit count and which bands had the most recent band cleaning operations based on a timestamp. In another implementation, operation 406 also determines which bands would, if cleaned, produce the greatest improvement in read throughput. For example, a band with a lower total read hit count may produce more improvement if cleaned than a band with a greater total read hit count if the band with the lower total hit count is experiencing a greater fragmentation rate than the band with the higher total hit count. In at least one implementation, one or more bands with the same hit count will be cleaned according to the band that has the highest fragmentation level of the band with the same hit count.

Operation 408 is to select a band for a band cleaning operation. Operation 408 may select a band for a band cleaning operation in a variety of ways. In an implementation, operation 408 selects the band with the highest hit count. In another implementation, operation 408 selects the band that would result in the greatest improvement in read throughout if cleaned. Operation 410 is to clean the band selected by operation 408. Operation 410 may include reading all of the tracks in the band selected in operation 408 or reading a subset of the tracks in the band selected in operation 408. The data read from some or all of the tracks in the band selected in operation 408 may be copied to a band cleaning cache. Operation 410 then reads data from a media cache that corresponds to logical block addresses corresponding to the band selected in operation 408. The data stored in the band cleaning cache is then modified by operation 410 based on the data read from the media cache. After the data in the band cleaning cache has been modified, the modified data is written to the band selected for cleaning in operation 408. The data in the media cache corresponding to the band selected for cleaning in operation 408 may then be evicted, thus freeing segments on the media cache and lowering media cache resource usage.

The implementations described herein are implemented as logical operations in one or more computer systems. The logical operations may be implemented (1) as a sequence of processor-implemented operations executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A data storage device comprising:
   a main data store for storing data arranged into a plurality of bands;
   a write cache including a plurality of segments, the segments configured to store data received from a host;
   a storage controller communicatively coupled to the host via a host interface and configured to allow the host to store data to and read data from the write cache and the main data store;
   a hit-tracking module configured to count read requests received from the host for the plurality of bands in a hit-tracking list; and
   a band cleaning module configured to perform a band cleaning operation to selectively update one of the plurality of bands with data from the write cache based at least in part on the hit-tracking list, wherein the band cleaning operation is a band rewrite operation.

2. The data storage device claim 1, wherein the band cleaning module is configured to perform a band cleaning operation on the band with the highest read request count in the plurality of bands.

3. The data storage device claim 1, wherein the hit-tracking module is further configured to:
   track the fragmentation level of the bands in the plurality of bands; and
   assign a weighted score to the bands in the plurality of bands based on read request count and fragmentation level.

4. The data storage device claim 3, wherein the band cleaning module is configured to perform a band cleaning operation on the band in the plurality of bands with the highest weighted score.

5. The data storage device claim 1, wherein the band cleaning module is further configured to perform band cleaning operations when the hit-based band cleaning data storage device is in an idle state.

6. The data storage device claim 1, wherein the band cleaning module is configured to adjust total time to perform band cleaning based at least in part on a workload level of the host.

7. The data storage device claim 1, wherein the band cleaning module is configured to perform a conventional band cleaning operation if the resource utilization of the write cache satisfies a resource usage condition.

8. A method comprising:
   instantiating, at a storage controller on a data storage device, a hit tracking list, the hit tracking list including entries, each entry associated with one of a plurality of bands on a main data store, the hit tracking list further including a plurality of hit counters, each hit counter associated with one of the plurality of bands;
   incrementing, in response to receiving, at the storage controller, a data read request from a host for data in a logical address corresponding to a track in a first band in the plurality of bands, a first hit counter associated with the first band in the plurality of bands; and
   performing a band cleaning operation on the first band based in part on the hit tracking list, the band cleaning operation including reading data from tracks of the first band, storing the read data in a cache, modifying the read data based on data evicted from a media cache, and rewriting the tracks of the first band with the modified data to produce a cleaned band.

9. The method of claim 8, further comprising creating a new entry in the hit tracking list associated with another of a plurality of bands on the main data store.

10. The method of claim 8, wherein the hit tracking list further includes a timestamp, the timestamp reflecting the time of the most recent incrementing operation.

11. The method of claim 8, further comprising resetting a second hit counter to zero, the second hit counter corresponding to a second band in the plurality of bands, after the second band has been the subject of a band cleaning operation.

12. The method of claim 8, wherein the data in a logical address corresponding to a track in a first band in the plurality of bands is located at least partially on a media cache.

13. The method of claim 8, wherein the entries corresponding to a plurality of bands on a main data store further include a logical block address start value and a logical block address end value, the logical block address start value and a logical block address end value identifying the logical block address space stored in the band corresponding to the entry.

14. The method of claim 8, further comprising hit tracking list resides in non-volatile memory.

15. A method comprising:
   parsing, at a storage controller, a hit tracking list, the hit tracking list including entries corresponding to a plurality of bands on a main data store, the hit tracking list further including a plurality of hit counters, each hit counter associated with one of the plurality of bands, the value of the hit counter reflecting a number of read requests received by a host for data in logical block addresses of the corresponding band;
   selecting, based on the hit tracking list, one band in the plurality of bands on the main data store for a band cleaning operation; and
   band cleaning the one band in the plurality of bands on the main data store, wherein the band cleaning is a band rewrite operation.

16. The method of claim 15, wherein the selecting operation includes selecting a band in the plurality of bands on the main data store with the highest hit counter value.

17. The method of claim 15, further comprising resetting the hit counter associated with the one band to zero after completion of the band cleaning operation.

18. The method of claim 15, wherein band cleaning operation is performed when a data storage device including the main data store is in an idle state.

19. The method of claim 15, wherein parsing, selecting, and band cleaning operations are performed only if the resource usage of a write cache satisfies a usage threshold.

20. The method of claim 15, further comprising updating a timestamp on the hit tracking list associated with one band of the plurality of bands on the main data store to reflect the time of the most recent completed band cleaning operation on the one band.

* * * * *